METHOD OF ELECTROLYTIC WATER SOFTENING AND pH ADJUSTMENT
Filed April 30, 1945
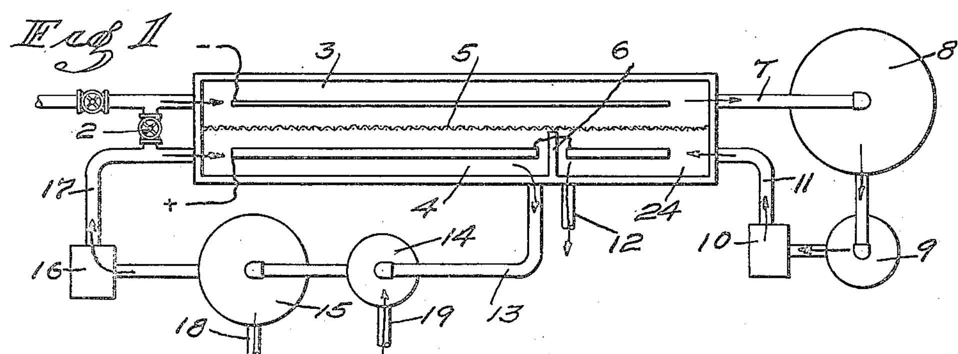
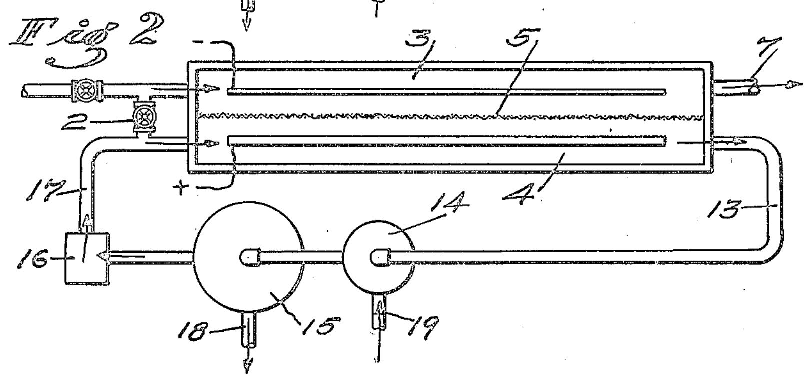
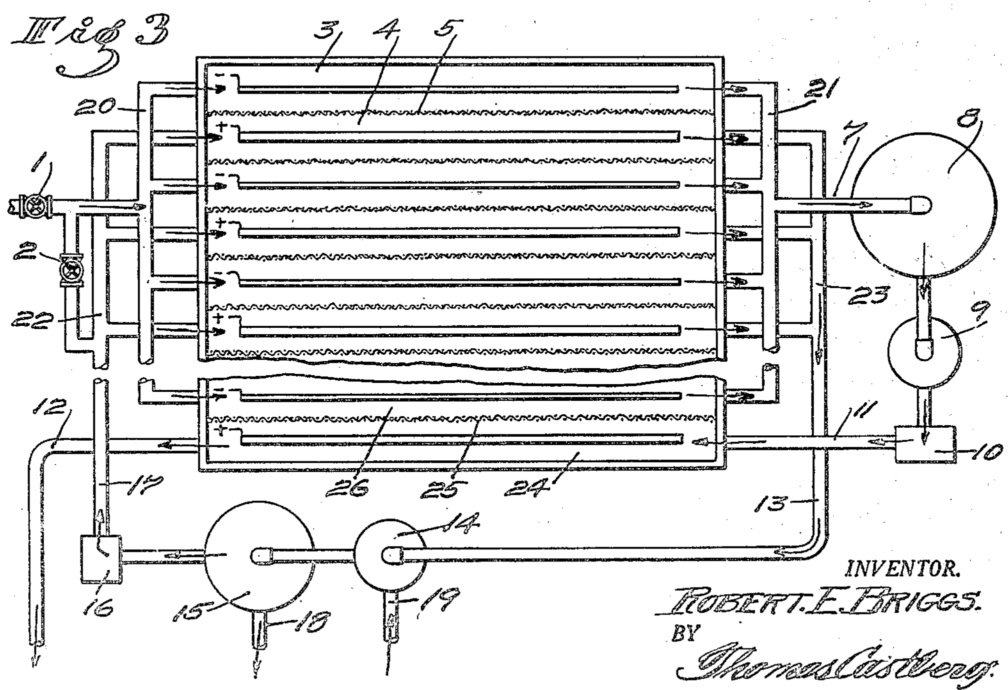
INVENTOR.
ROBERT E. BRIGGS.
BY
Thomas Castberg
Atty.

Patented Dec. 26, 1950 2,535,035

UNITED STATES PATENT OFFICE 2,535,035

METHOD OF ELECTROLYTIC WATER SOFTENING AND pH ADJUSTMENT

Robert E. Briggs, La Verne, Calif.

Application April 30, 1945, Serial No. 591,195

3 Claims. (Cl. 204—151)

This invention deals primarily with an improvement in a method of electrolytic water softening previously disclosed and upon which United States Letters Patent Number 2,341,356 was granted.

The improvement provides a method and a means of reducing the amount of waste solution involved in electrolytic water softening and at the same time serves to increase the efficiency of the electrolytic influence. This is accomplished in part by recirculating the acid solution flowing from an electrolytic cell which was previously discarded after one pass through the anode compartment. The recirculation, involving a relatively large volume per unit of time, tends to increase the flow velocity and prevent local over-acidification within the anode chamber. A further advantage is gained by adding an alkalizing agent to the solution, tending to counteract its acidity, before it is recirculated through said anode compartment. The method will be found to be of particular advantage when waters are to be treated which contain a large quantity of acid ions or radicals.

To aid in description of the invention and to show some of the possible applications, the following drawings are presented:

Figure 1 represents a single cell provided with a pH reduction section. Means have been provided for treating and recirculating the anode solution previously discarded;

Figure 2 represents a simple two-compartment electrolytic cell used for water softening. It is also provided with an anode treating and recirculating system; and Fig. 3 represents an assembly of cells arranged so that one of the anode chambers of the group accomplishes the pH reduction of the alkalized and softened water. The unit is provided with a treating and recirculating system for the acid discharges of the other anode chambers of the assembly.

In this presentation, as in the previous disclosure (United States Letters Patent Number 2,341,356), it will be noted that the primary objective is that of economically softening hard waters or hard water solutions. The pH reduction of the water which has been alkalized during the electrolytic softening may be considered as secondary although of considerable importance. The one is more or less dependent upon the other for economic production of a soft water of relatively low dissolved solids. Therefore, for convenience and clarity in describing the procedure outlined in the drawings, that portion of the apparatus devoted to alkalization and softening will be referred to as the primary effect and that portion of the apparatus devoted to the pH reduction will be referred to as the secondary effect. The part of the apparatus dealing with the handling of the anodic discharge solution which ultimately becomes waste and concerning which the principal claims for invention are based, will be considered in its own light.

In describing the flow procedure represented in Fig. 1, a review of disclosures incorporated in the United States patent aforementioned will set the stage for introduction of the new art. Raw water bearing hardness ingredients is introduced to an electrolytic cell having a cathode chamber 3, an anode chamber 4 and a porous diaphragm 5. A partition 6, which is subject to change of location, divides the anode chamber into two sections. The major portion of the water entering flows through the cathode chamber 3 where it becomes alkalized due to electrolytic influence and considerable quantities of the hardness ingredients are precipitated. The outflow passes through a line 7 to a settling tank 8 for removal of most of the precipitate and the overflow from tank 8 passes through a sand filter 9 for final clarification. The clear alkaline water is transferred by a pump or lift 10 through a line 11 to a section of the anode chamber 24 where the pH is reduced to a desired point; it is then discharged through a line 12 as a finished product.

The solution flowing through the anode section 4, which ultimately becomes waste, is conducted through a line 13 to an agitator or mixer 14 where it joins a flow of alkalizing agent, such as milk of lime, entering through a line 19. The alkaline material thus added is in addition to any seepage of catholyte through the diaphragm which may take place as disclosed in my patent mentioned above. The mixing of the two flows results in the formation of a precipitate (calcium sulphate or the like if milk of lime is used) which can be removed conveniently by settling in the tank 15 before the solution is returned by the pump or lift 16 through a line 17 to the anode section 4 for recirculation. Usually the solution bearing the alkalizing agent will supply a sufficient quantity of make-up water to prevent over-concentration of salts in the anode recirculating system but it may be found desirable to introduce a small quantity of fresh raw water through the control device 2 or at some other location. An overflow line 18 is provided most conveniently at the settling tank 15 as a means of discarding a quantity of solution equal to the amount of make-up water introduced. For recirculation of the anode solution without addition of an alkalizing agent, the mixer 14 and the feed device 19 would be eliminated. The tank 15 becomes a receiver for the acid solution and the overflow line 18 eliminates a volume of solution equal to the make-up water introduced to the system through the control valve 2.

Although other alkalizing agents may be used, milk of lime is to be preferred because of convenience in handling, cheapness and availability. The sludge accumulating in the settling tank 8 which has been precipitated from the water undergoing treatment for softening can be used also, but in most cases the quantity will not be sufficient to accomplish all of the desired acid counteraction for the anode discharge. The amount of alkalizing agent required will vary with the amount of waste reduction desired, with the quality of the water being softened and the quality sought for the final product of softened water. It can be stated as an example that when a water having a hardness content of 360 parts per million, a sulphate content of 375 P. P. M. and a chloride content of 100 P. P. M. is softened to 100 P. P. M. soap hardness, approximately one pound of lime will be required per 1000 gallons of water softened. For such a water the acid outflow from the anode chamber should be about 2 pH or above; stronger acidity than this (pH below 2) for the solution in the anode chamber tends to have an adverse effect on the solution being softened in the cathode chamber. The amount of alkalizing agent can be varied, however, to effect a fairly wide range in pH adjustment from a moderate rise, in which case the recirculated solution is still definitely acid, to that of making it neutral or even alkaline with a pH above 7.

For the above cited example of lime usage, the anode waste would be reduced from about 10% of the total water introduced to the softening treatment to about 2% of that volume and the electric energy required would be reduced about 30%. At the same time, even with a reduced requirement in ampere hours per gallon, the pH of the water in the primary effect (that under cathodic influence) can be raised to about 11 pH or above and magnesium, if present, can be almost completely precipitated leaving the hardness in the form of calcium.

Figure 2 demonstrates the use of the alkalizing and recirculating system for the anode solution as it is applied to an electrolytic cell employed for softening water by cathodic influence. The alkaline outflow through the line 7 is either used as discharged or subjected to aeration or other means for pH reduction rather than applying electrolytic means for that purpose. Treatment and recirculation for the anode solution are applied in the manner described for Figure 1.

Figure 3 shows the anode solution treating system as applied to an assembly of two compartment cells in which one anode chamber 24 is devoted to pH reduction of the water softened by all the cathodic or primary influence of the assembly. The other anode discharges are collected and subjected to the alkalizing and recirculating treatment described above. The effect is to all intents and purposes the same as that of a single cell in which a portion of the anode chamber is devoted to pH reduction but this arrangement provides a means of softening a large volume of water with a relatively compact treating unit.

The flow procedure of Figure 3 involves introduction of the raw water through the master valve or control device 1. The major portion is distributed by a common header 20 in substantially equal amounts to the cathode chambers of the primary effect. The outflow from the cathode chambers is also collected by a common header 21 and transferred through a line 7 to a suitable clarifying device. The clear solution is introduced to the anode chamber 24 where the pH is reduced to a desired point and is then discharged through the line 12 as the final product. The outflow from the other anode chambers is collected by the common header 23, transferred to the treating system described above and returned through the line 17 to the header 22 for recirculation through the anode chambers of the primary effect. The pH reduction section, including the anode chamber 24, the cathode chamber 26 and the diaphragm 25, with the accompanying attachments, may be located at a point more or less remote from the primary assembly of cells if convenience should so demand. It is not required that the current density and E. M. F. imposed on the secondary effect be the same as that of the primary effect in an assembly of cells, but it is considered an advantage to establish the electrode area so that such a condition will prevail. A definite ratio for electrode area involved in the two effects cannot be given that will meet all situations for it will vary with conditional demands.

On the basis of the disclosures herein it is evident that the advantages of this new and improved process are several and considerable. Reduction in the quantity of waste solution for any softening process is an economic factor from the standpoint of cost of the supply water and waste disposal. Recirculation of the anode solution makes possible a considerable flow per unit of time which tends to reduce stagnation and local over-acidification by increasing the velocity of flow within the anode chamber and thus permits a smaller quantity of final waste. Treatment of the acid solution with an alkalizing agent such as lime brings about precipitation of such constituents as sulphates, giving the recirculated solution a greater absorbing power and thus permits a further reduction in the quantity of waste.

Reduction in electrical energy expended to accomplish a specified amount of softening effect is also an important factor. Highly soluble constituents such as chlorides tend to increase in concentration in the recirculated solution thus tending to increase its conductivity and to decrease the resistance of the electrolytic cell. Actual operational tests have shown a further increase in electrical efficiency which can be substantiated in theory by the assumption that the introduction of positive ions such as calcium to the anode solution tend, through ion migration, to fortify the solution in the cathode chamber with additional hydroxyl ions.

Improvement in quality of the water produced, although of minor significance, is nevertheless a factor of importance for some usage. Elimination or reduction to a low content for such constituents as magnesium is made possible by the increased ease of attainment of a pH value of 11 or above for the cathode discharge.

Having thus described my invention, what I claim and desire to secure by Letters Patent is:

1. The method of softening hard water by treatment in the cathode compartment of a diaphragm electrolytic cell having a cathode positioned in a cathode compartment and an insoluble anode positioned in an anode compartment, which process comprises, flowing said hard water as a catholyte through said cathode compartment in contact with said cathode, recirculating a separate aqueous anolyte through said anode compartment in contact with said anode, passing direct current between said anode and cathode whereby the pH of said anolyte decreases and the pH of said catholyte increases, discharging a portion of said anolyte to waste, adding make-up water to said anolyte and adding an alkaline material to said anolyte during said recirculation in addition to any seepage of catholyte through said diaphragm and sufficient to maintain the pH of said anolyte in said anode compartment above approximately 2, and subjecting said catholyte to treatment in said cathode compartment for sufficient time to cause precipitation of insoluble alkaline compounds of hardness producing materials.

2. The method defined in claim 1 in which alkaline compounds precipitated in said catholyte are employed as at least part of the alkaline material added to said anolyte.

3. The method defined in claim 1 in which at least a part of the alkaline material added to said anolyte is calcium hydroxide.

ROBERT E. BRIGGS.

REFERENCES CITED

The following references are of record in the file of this patent:

UNITED STATES PATENTS

| Number | Name | Date |
|---|---|---|
| 1,371,698 | Linder | Mar. 15, 1921 |
| 1,840,105 | Kean | Jan. 5, 1932 |
| 2,341,356 | Briggs | Feb. 8, 1944 |